Dec. 13, 1927.

W. S. GALVIN

VULCANIZER

Filed July 16, 1926

INVENTOR.
WADE S. GALVIN.

BY

ATTORNEY.

Dec. 13, 1927.

W. S. GALVIN 1,652,473

VULCANIZER

Filed July 16, 1926

INVENTOR.
WADE S. GALVIN.
BY
ATTORNEY.

INVENTOR.
WADE S. GALVIN.
BY
ATTORNEY.

Patented Dec. 13, 1927.

1,652,473

UNITED STATES PATENT OFFICE.

WADE S. GALVIN, OF AKRON, OHIO, ASSIGNOR TO THE AKRON STANDARD MOLD COMPANY, OF AKRON, OHIO, A CORPORATION OF OHIO.

VULCANIZER.

Application filed July 16, 1926. Serial No. 122,840.

This invention relates to a vulcanizer and particularly to that type of vulcanizer known as the "watchcase" type in which there is provided a central or stationary section, on either side of which is mounted a movable section, the movable sections each completing a single mold cavity with the stationary section when the apparatus is closed.

The present invention relates to a new and useful combination of the elements of a watchcase vulcanizer by which the apparatus is especially adapted for rapid and economical vulcanization of automobile tires. The invention has to do especially with the curing of pneumatic automobile tires by the air bag method and avoids the necessity for certain preliminary operations which have heretofore been universally used in the operation of these devices as will be explained.

In the assembling of unvulcanized tire casings and air bags ready for placement in the vulcanizer, it has been the general rule to provide a pair of curing rings which secure the beads of the tire and form a seat for the air bag. These rings are oppositely facing, heavy metal flanges which are placed, with the tire and air bag, in a heavy press and given a preliminary compression, known in the trade as a "rimming up" operation. This operation properly seats the beads and the air bag in the tire and while the curing rings are held together in the press, temporary fastening devices are applied to the rings to hold them in proper position during the subsequent vulcanizing operations. The assembled tire, air bag and curing rings are then carried to the heater and placed in proper position therein. This series of steps has heretofore been necessary to secure the proper location of the tire and air bag within the mold. No heater of the type here illustrated has been provided with mechanism which will enable the tire and air bag to be properly seated without the preliminary rimming operation, and it has always been the practice, prior to my invention, to go through the preliminary "rimming up" operations on heavy and expensive hydraulic presses. This not only increases the cost and time of curing tires, but also requires the outlay on heavy equipment and the employment of additional operations.

The present invention has for its object the construction of a vulcanizer of the type referred to, in which it is unnecessary to provide for a separate rimming up operation, the machine being so designed that the curing rings can be permanently attached to or made a part of the sections, the tire and air bag being placed within the vulcanizer without "rimming up." The mechanism for closing and locking the vulcanizer sections is so coordinated and arranged that it will operate to force the tire and air bag in position upon the rings as perfectly and accurately as can be done with the usual hydraulic press. The invention, therefore, embodies the combination of the vulcanizer sections, the curing rings permanently secured to or as a part of the sections, and locking and clamping mechanism which will give a primary closing movement which will force the tire and air bag in position upon the curing surfaces.

Certain features of the invention may be applied to vulcanizers for curing other articles than tires, being adaptable for the curing of tubes, beads or the like, and the claims herein are not directed particularly to the curing of tires unless so stated.

In the drawings is shown one form of the invention, it being understood that the invention as thus shown and described is capable of embodiment in other forms than that shown, and that modifications and variations may be made within the scope of the invention as set forth in the claims and statement of the invention.

Figure 1:
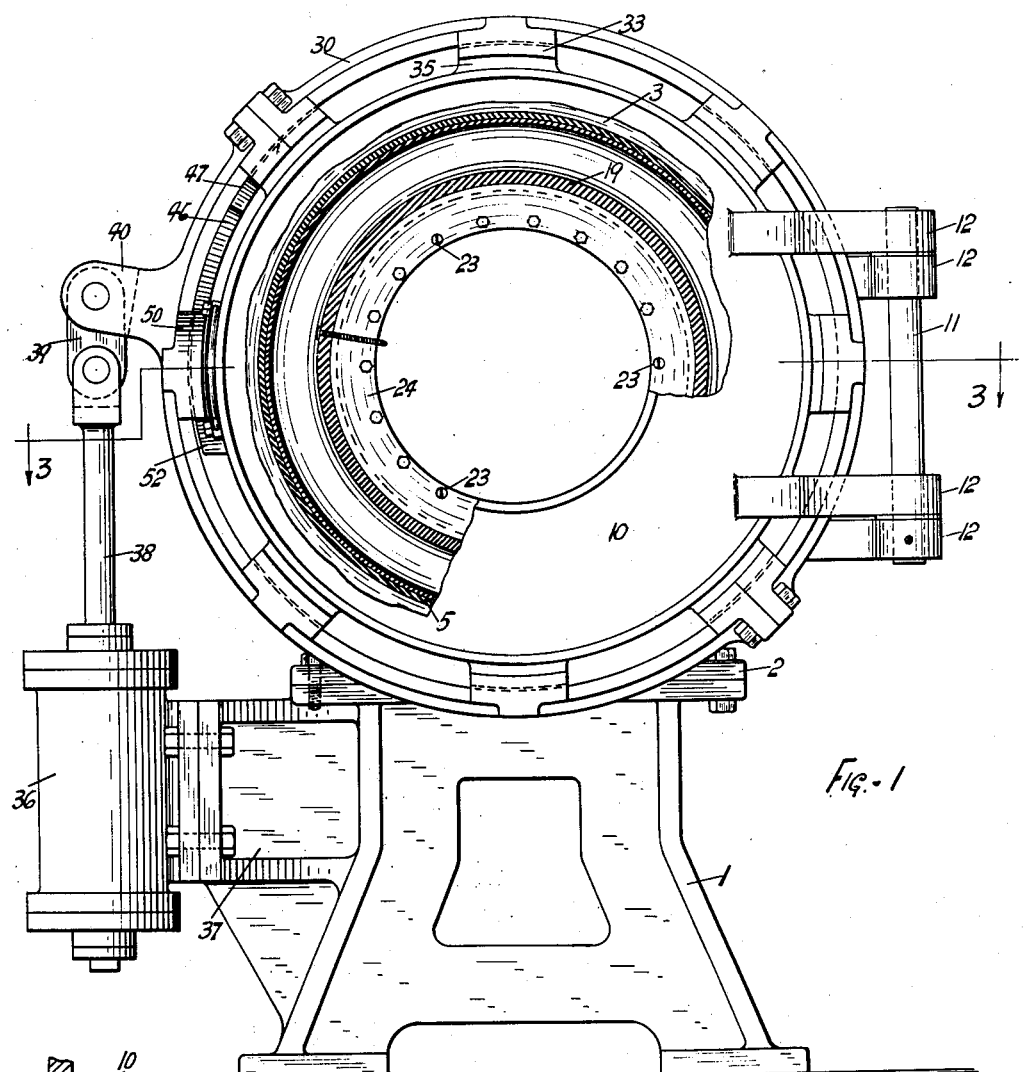
Figure 1 is a side view showing the vulcanizer, a portion being broken away to show the interior construction.
Figure 7:
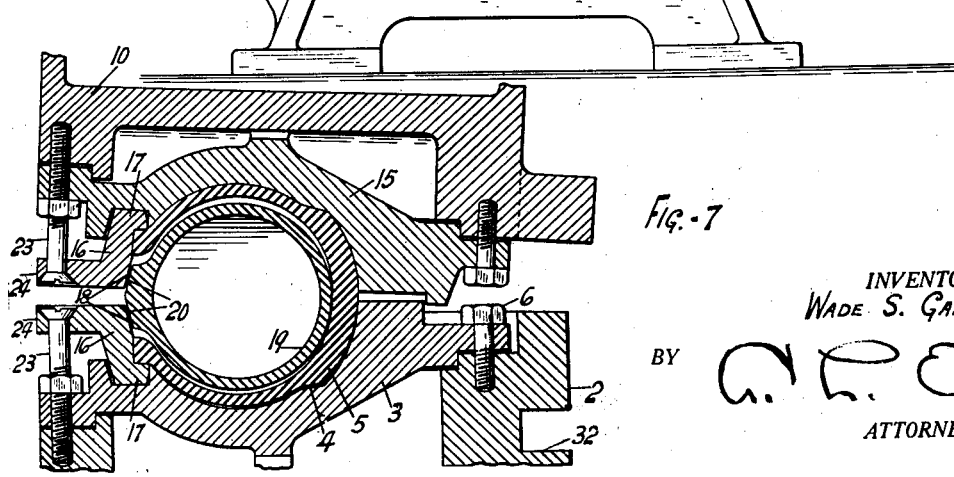
Figure 7 is a detail view showing the manner in which the vulcanizer sections close upon the tire and air bag and perform the "rimming up" operation.
Figure 2:
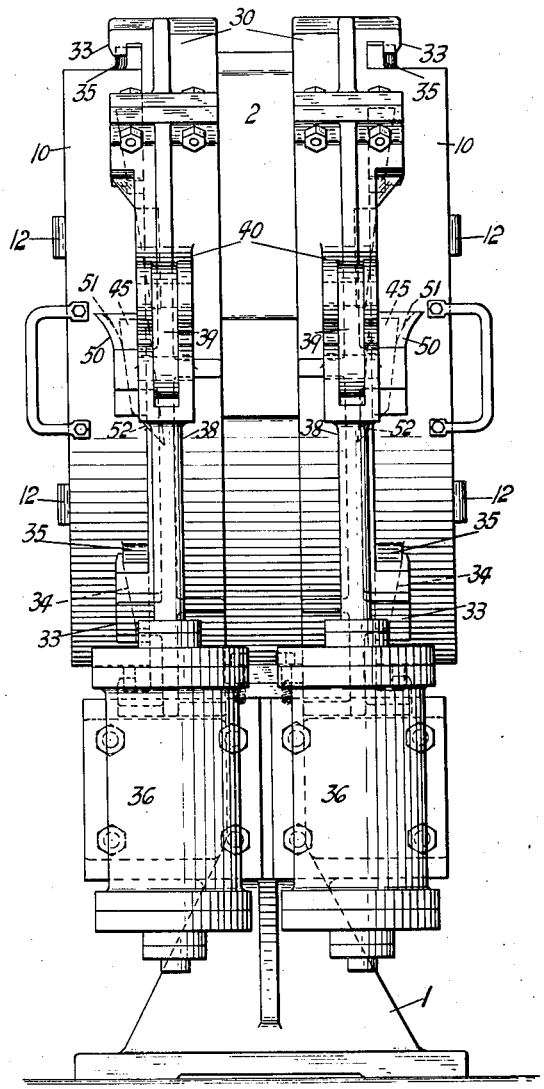
Figure 2 is an edge view.
Figure 5:
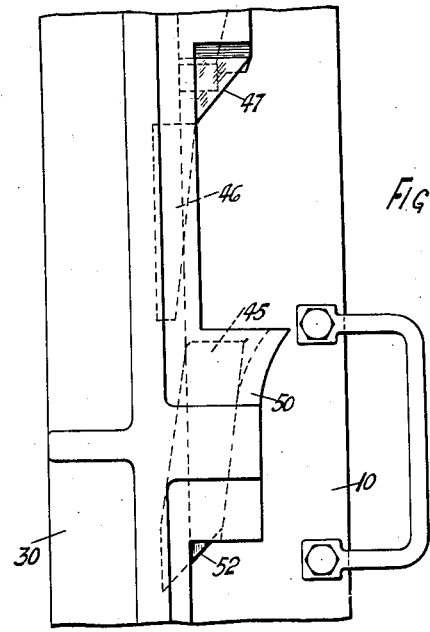
Figure 5 is an enlarged detail showing the vulcanizer closed.
Figure 6:
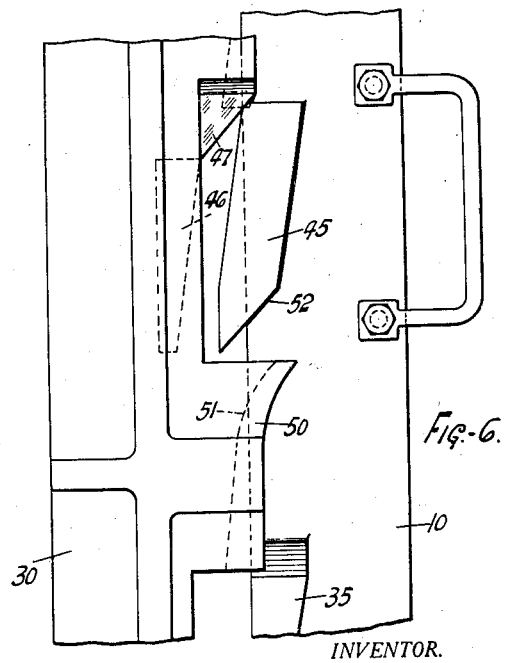
Figure 6 is an enlarged detail showing the vulcanizer ajar and ready for the closing or rimming up operation.
Figure 3:
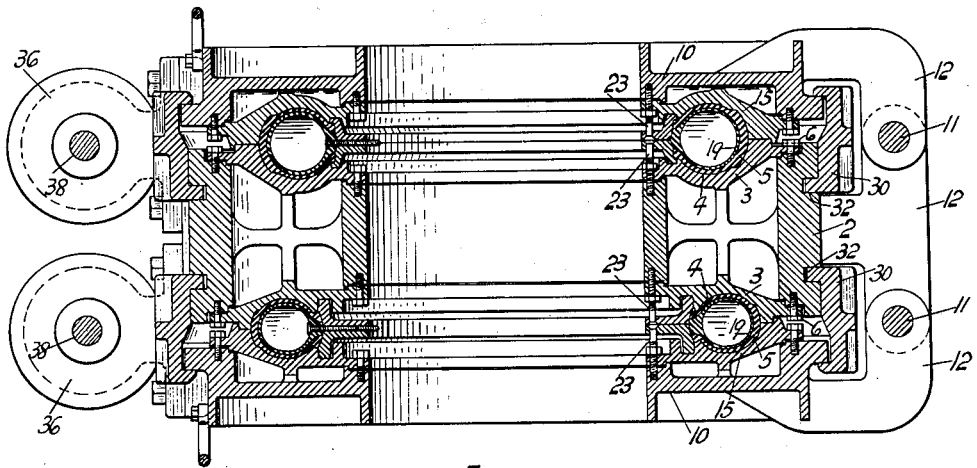
Figure 3 is a horizontal section on the line 3—3 of Figure 1.
Figure 4:
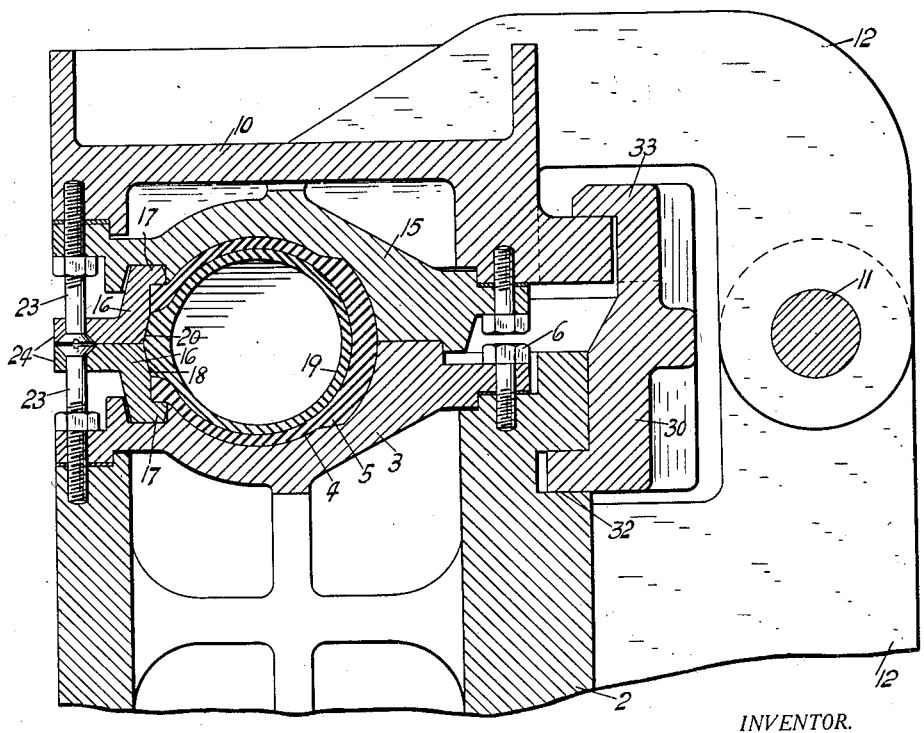
Figure 4 is an enlarged detail view showing one of the units.

The apparatus comprises a stand or support 1, to the upper surface of which is attached the central or stationary vulcanizer section 2, the interior of which is hollowed out or chambered for the circulation of steam. The sides of the central section are closed in by plates 3, the outer surfaces of which are shaped to form cavities 4 for the reception of the tire casing 5. The plates 3 are permanently attached to the stationary section by bolts 6, suitable gaskets or packings being provided to seal the crevices and prevent the escape of steam. The plates can be changed for the vulcanization of different tires.

To each side of the stationary section are pivoted movable sections 10, carried upon vertical pivot pins 11 passing through brackets 12 on the stationary and movable sections. The sections 10 are chambered for the circulation of steam and are closed in by mold plates 15 in the same manner as the stationary section, the plates 3 and 15 forming the molding cavities for the tires.

To each of the mold sections is permanently secured a bead shaping and forming ring 16 which is formed with a flange 17 adapted to bear against the side of the tire bead. The outer surface of the bead ring is formed with a tapered or wedge shaped surface 18, the air bag 19 being formed with a correspondingly tapered inner circumference 20, which, when the mold is closed, seats within the shallow tapered groove formed by such surfaces. The tapering of these surfaces assists in the preliminary closing operation and the positioning of the tire and air bag in the vulcanizer. Each ring is fastened to its vulcanized section by elongated bolts 23 passing through the flange 24 and into the vulcanizer sections.

To close the mold and force the tire and air bag in position and secure the mold while the vulcanizing operation is going on, rotatable locking rings 30 are mounted upon the stationary section at each side thereof, being received within and guided by circular grooves 32 in the stationary vulcanizer section. Each ring projects beyond the stationary section and is provided with inwardly projecting lugs 33, the under surfaces of which are tapered, as at 34, and adapted to bear against and mate with similarly tapered lugs or projections 35 on the movable mold section 10.

Each locking ring 30 is rotated by means of a fluid pressure cylinder 36 which is mounted at the side of the support 1 upon a bracket 37. The piston 38 of the cylinder 36 is connected by a link 39 with a lug 40 projecting outwardly from the ring so that the ring may be turned easily and quickly and with sufficient force so as to effect the locking operation.

In order to open the vulcanizer or "crack" it, an additional lug 45 is formed on the swinging vulcanizer section, this lug contacting with a correspondingly shaped lug 46 formed on the locking ring. When the ring is turned in one direction, the several lugs 33 will engage with the lugs 35 and lock the vulcanizer sections together. When the ring is rotated in the opposite direction, the breaking lug 46 will bear against the lug 45 and will open the mold section. A somewhat increased taper on the lug 46, as indicated at 47, moves the swinging section outwardly rapidly at the end of the unlocking movement.

The lug 45 is used for the rimming up operation and for this purpose a special lug known as a "drawing lug" 50 is formed on the ring 30 which is formed with a tapered inner surface 51, starting with a sharper curvature at its forward end, adapted to bear against surface 52 on the lug 45. This device gives the initial closing operation to the vulcanizer and seats the air bag and tire properly upon the bead rings.

The operation of the device will be understood by those skilled in the art. By the permanent mounting of the bead shaping and curing rings in the vulcanizer sections and the provision of the means on the locking ring to force the sections together, the tire may be seated as shown without the preliminary "rimming up" operation, thus securing the benefits of rapid and economical operation as have been fully set forth.

What is claimed is:

1. In a vulcanizer, a stationary section and a movable section, a bead and air bag supporting surface on each section, and means to seat the air bag and the tire beads upon said surfaces, comprising a device to give a preliminary closing movement to the movable section and additional devices to force the sections together and securely clamp them in engagement with one another.

2. In a vulcanizer, a stationary section and a movable section, a bead and air bag supporting surface on each section, means to give the sections a preliminary closing movement to seat the tire beads and the air bag upon the supporting surfaces, and additional means to clamp the sections together comprising a rotatable locking ring on one of the sections and mating tapered lugs on the other section and the locking ring, one of said pairs of lugs operating prior to the others to effect the preliminary closing movement.

3. In a vulcanizer, a stationary section and a movable section, and means to close and lock the movable section against the stationary section comprising a rotatable ring about one of said sections having a plurality of tapering lugs thereon, mating tapering lugs upon the other section, an additional tapering lug upon the ring having a longer range of movement than the aforesaid lugs, and adapted to engage the other section and close the vulcanizer prior to the operation of the tapering lugs which lock the vulcanizer.

4. In a vulcanizer, a stationary section and a pivoted section, means to move the pivoted section to close and lock the vulcanizer comprising a rotatable locking ring upon one of the sections, a plurality of lugs distributed about the ring, a plurality of cooperating, mating lugs upon the other section, the said lugs locking the vulcanizer about the entire periphery thereof, and a secondary lug upon the ring at a point remote from the pivot thereof, adapted to draw the pivoted section into contact with the stationary section to effect a preliminary closing action.

5. In a vulcanizer, a stationary section and a movable section, means to draw the movable section into closed position against the stationary section, and additional means to lock the sections together about the entire perimeter of the vulcanizer comprising a plurality of wedge lugs upon one of the sections, and a rotatable ring about the other section having an equivalent number or wedge lugs to cooperate with the first named wedge lugs.

6. In a vulcanizer, a stationary section and a pivotally mounted, movable section, a common operating mechanism having means to lock the vulcanizer about its entire periphery, and an additional means to draw the sections together to give a preliminary closing thereto, said mechanism comprising a rotating locking ring, having a plurality of locking lugs about its periphery, an additional cam shaped lug to effect the preliminary closing operation, said lug being located at a point remote from the pivot of the movable section, and a lug upon the pivoted section with which said cam shaped lug cooperates.

7. In a vulcanizer, a stationary section and a movable section, means to give the sections a preliminary closing movement, and additional means to clamp the sections together comprising a rotatable locking ring on one of the sections, and mating tapered lugs on the other section and the locking ring, one of said pairs of lugs operating prior to the others to effect a preliminary closing movement.

8. In a vulcanizer, a stationary section and a movable section, a rotating ring about one of the sections, means to rotate the ring in opposite directions, a lug upon the ring operative before the sections are closed to draw the sections together, a plurality of mating, clamping lugs upon the ring and upon the other section adapted to lock the sections together upon rotation of the ring in one direction, and a breaking lug on the ring adapted to break the adhesion between the sections when the ring is rotated in the opposite direction.

9. In a vulcanizer, a pair of sections which are movable relatively to one another to open and close, a rotatable ring about the vulcanizer, the ring being mounted upon one of the sections, a plurality of spaced locking lugs about the ring, a plurality of similarly spaced locking lugs about the other section, a secondary lug extending at the side of one of the locking lugs in the ring and having a greater effective range, and a lug upon the other section with which the secondary lug cooperates to effect a preliminary closing movement of the sections.

WADE S. GALVIN.